United States Patent [19]

Scott et al.

[11] 4,234,441

[45] Nov. 18, 1980

[54] SILICONE OIL COMPOSITIONS CONTAINING SILICATE CLUSTER COMPOUNDS

[75] Inventors: Robert N. Scott, Wallingford; David F. Gavin, Cheshire; Frank J. Milnes, Guilford, all of Conn.

[73] Assignee: Olin Corporation, New Haven, Conn.

[21] Appl. No.: 33,767

[22] Filed: Apr. 27, 1979

[51] Int. Cl.$^3$ .......................... C09K 5/00; C07F 7/04; C07F 7/18

[52] U.S. Cl. ................................. 252/78.3; 556/450; 556/451

[58] Field of Search ........................................ 252/78.3

[56] References Cited

U.S. PATENT DOCUMENTS

| | | | |
|---|---|---|---|
| 3,019,191 | 1/1962 | Furby et al. | 252/78.3 |
| 3,091,590 | 5/1963 | Furby et al. | 252/78.3 |
| 3,960,913 | 6/1976 | Knollmueller | 252/78.3 X |
| 3,965,135 | 6/1976 | Knollmueller | 252/78.3 X |
| 3,965,136 | 6/1976 | Knollmueller | 252/78.3 X |
| 3,992,429 | 11/1976 | Knollmueller | 252/78.3 X |
| 4,058,546 | 11/1977 | Knollmueller | 252/78.3 X |
| 4,086,260 | 4/1978 | Knollmueller | 252/78.3 X |
| 4,132,664 | 1/1979 | Knollmueller | 252/78.3 X |

*Primary Examiner*—Paul F. Shaver
*Attorney, Agent, or Firm*—William A. Simons; Thomas P. O'Day

[57] ABSTRACT

Novel compositions are described comprising silicone oils and silicate cluster compounds. The addition of the cluster compounds serves to enhance the silicone oils and accommodate the solubilizing of various additive materials that otherwise are not compatible with the silicones.

13 Claims, No Drawings

SILICONE OIL COMPOSITIONS CONTAINING SILICATE CLUSTER COMPOUNDS

Since their development in the late 1930's, silicones have become widely known and utilized. Silicones feature valuable properties which make them useful in some special applications. All of the silicones exhibit the properties of not being wet by water and of resistance to relatively high temperatures. The oils also have the unique property of remaining fluid at low temperatures. These features of silicone oils have made them useful in a variety of applications including use as dielectrics, solvents, mechanical working media, dampening agents, lubricant base oils and processing aids. However, in addition to their favorable features, silicone oils are marked by some rather serious deficiencies which tend to restrict their usefulness.

Silicone oils, without supporting additives, are not oxidatively stable at high temperatures and break down to form gels. Further, they are characterized by poor steel-on-steel lubricity properties. To compensate for these deficiencies, various known materials can be employed as additives. Unfortunately, silicone oils are poor solvents for many of the commonly used functional fluid additives; and, the silicones demonstrate poor response to many of the few additives that do dissolve in them.

It has now been discovered, according to the present invention, that novel compositions comprising silicone oils and silicate cluster compounds exhibit several significant improvements over conventional silicone oil fluids. The addition of these silicate cluster compounds to the silicone oil effects a distinct improvement in steel-on-steel lubricity, and also lowers the pour point of the resulting fluid. As perhaps the most critical improvement factor, the presence of the silicate cluster compounds in the silicone oil composition accomodates the ready solubilizing of various useful additive materials which otherwise are not sufficiently soluble in silicone oil for practical utility. The compositions of the present invention exhibit enhanced response to various additives as well.

The silicone oils which form the base of the present invented composition can be any such silicone material. Conventional silicone oils include alkyl silicones, polydimethyl silicones, polyphenylmethyl silicones, polychlorophenylmethyl silicones, polytrifluoropropyl silicones, and the like. Such oils are prepared from organosilicon compounds by methods well known in the art. Polydimethyl silicones, for example, which are preferred, commonly are formulated by hydrolysis of dimethyl silicon dichloride to form a controlled molecular weight water-insoluble oily polymer.

Silicate cluster compounds form an essential element of the invented compositions. These compounds include alkoxysilane cluster compounds, alkoxysilanol cluster compounds, halogenated alkoxysilane cluster compounds, alkoxysilane multiple cluster compounds, and silicone bridged alkoxysilane double cluster compounds. Such compounds and their preparation are more fully described in commonly assigned U.S. Pat. Nos. 3,960,913; 3,965,135; 3,965,136; 3,992,429; 4,058,546; and 4,086,260. The disclosures of all of these respective patents hereby are incorporated by reference in their entireties.

The use of alkoxysilane cluster compounds, alkoxysilane multiple cluster compounds, and silicone bridged alkoxysilane double cluster compounds (more fully described in U.S. Pat. Nos. 3,965,136, 3,992,429, and 4,058,546 respectively) is preferred. Alkoxysilane cluster compounds are particularly preferred. These alkoxysilane clusters have the general formula:

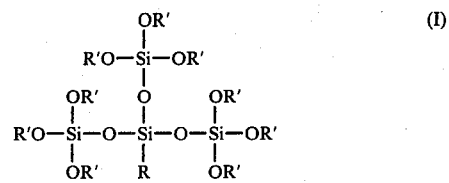

(I)

wherein R is hydrogen, alkyl, alkenyl, aryl or aralkyl and each R' is independently selected from the same group as R with the proviso that at least a majority of R' radicals on each Si are sterically hindered alkyl groups having at least 3 carbon atoms.

Desirably, R is hydrogen, an alkyl or alkenyl having about 1 to about 18 carbon atoms or an aryl or aralkyl having about 6 to about 24 carbon atoms. Preferably, R is hydrogen, an alkyl having about 1 to about 8 carbon atoms or an aryl or aralkyl having about 6 to about 14 carbon atoms. In Formula (I), each R' is independently selected from the same group as R, with the proviso that at least a majority of the R' radicals are sterically hindered alkyl groups having at least 3 carbon atoms. The desired and preferred groups for R' are the same as for R subject to the preceding proviso. Desirably, at least a majority of the R' radicals are sterically hindered alkyl groups having about 3 to about 24 carbon atoms and preferably are sterically hindred alkyl groups having about 4 to about 12 carbon atoms. By sterically hindered alkyl groups is meant alkyl radicals which contribute to the hydrolytic stability of the molecule, i.e., which inhibit the reaction of water with the silicon-oxygen or the carbon-oxygen bonds in the molecule. Exemplary of sterically hindered alkyl radicals are non-linear primary alkyl radicals having a beta position side chain of at least 2 carbon atoms, secondary alkyl radicals and tertiary alkyl radicals. Particularly useful sterically hindered alkyl groups include sec. butyl, isobutyl, 2-ethyl butyl, 2-ethyl pentyl, 3-ethyl pentyl, 2-ethyl hexyl, 3-ethyl hexyl, 2,4-dimethyl-3-pentyl, etc.

The alkoxysilane multiple cluster compounds feature the general formulae:

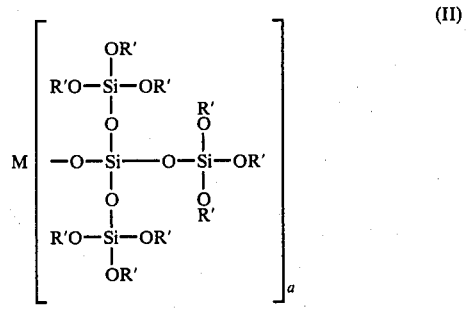

(II)

and

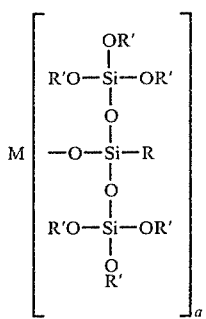

(III)

wherein a=2, 3 or 4; M is a substituent branched or straight chain hydrocarbon radical; R is hydrogen, alkyl, alkenyl, aryl or aralkyl and each R' is independently selected from the same group as R with the proviso that at least a majority of R' radicals on each Si are sterically hindered alkyl groups having at least 3 carbon atoms.

The compounds used in the present invention are those represented by the above formulas wherein a=2, 3 or 4, as mentioned. Desirably, a=2 or 3 and preferably a=2. The substituent M is defined as a substituted or unsubstituted hydrocarbon radical, either branched or straight chained and branched radicals are preferred. By hydrocarbon radical is meant both oxylated radicals and radicals which have not been oxylated. Thus, M may be a straight or branched chain hydrocarbon diradical, triradical or tetraradical containing carbon and hydrogen atoms, with or without inert substituents. Alternatively, M may be a straight or branched chain hydrocarbon diradical, triradical or tetraradical having one or more ether and/or ester units, with or without inert substituents. The radical M is a hydrocarbon radical, as defined, having up to about 25 carbon atoms, desirably having about 2 to about 18 carbon atoms, and preferably having about 4 to about 12 carbon atoms. The hydrocarbon radical may, as mentioned, be unsubstituted or it may be substituted and these substituents include, e.g., hydroxy groups, phenyl groups and any substituents which do not interfere with the hydrolytic stability of the molecule to an undesirable degree.

R is defined as hydrogen, an alkyl, alkenyl, or aryl or aralkyl radical. Desirably, R is hydrogen, an alkyl or alkenyl having about 1 to about 18 carbon atoms or an aryl or aralkyl having about 6 to about 24 carbon atoms. Preferably, R is hydrogen, an alkyl having about 1 to about 8 carbon atoms or an aryl or aralkyl having about 6 to about 14 carbon atoms. In the above formulas, each R' is independently selected from the same group as R, with the proviso that at least a majority of the R' radicals are sterically hindered alkyl groups having at least 3 carbon atoms. The desired and preferred groups for R' are the same as for R subject to the preceding proviso. Desirably, at least a majority of the R' radicals are sterically hindered alkyl groups having about 3 to about 24 carbon atoms and preferably are sterically hindered alkyl groups having about 4 to about 12 carbon atoms. By sterically hindered alkyl groups is meant alkyl radicals which contribute to the hydrolytic stability of the molecule. Exemplary of sterically hindered alkyl radicals are non-linear primary alkyl radicals having a beta position side chain of at least 2 carbon atoms, secondary alkyl radicals and tertiary alkyl radicals. Particularly useful sterically hindered alkyl groups include sec. butyl, isobutyl, 2-ethyl butyl, 2-ethyl pentyl, 3-ethyl pentyl, 2-ethyl hexyl, 3-ethyl hexyl, and 2,4-dimethyl-3-pentyl, etc.

The silicone-bridged alkoxysilane double cluster compounds have the general formula:

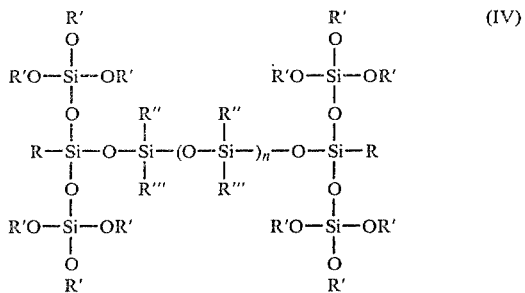

wherein n is an integer from 0 to 300; R is hydrogen, alkyl, alkenyl, aryl, aralkyl or —OSi(OR')$_3$; each R' is independently selected from alkyl, alkenyl, aryl or aralkyl with the proviso that at least a majority of R' radicals are sterically hindered alkyl groups having at least 3 carbon atoms; and R'' and R''' are independently selected from hydrogen, alkyl, alkenyl, aryl, aralkyl, hydroalkyl, and halo or cyano substituted alkyl, alkenyl, aryl, aralkyl, and hydroalkyl.

As defined above, the group R of the Formula IV reactant is hydrogen, alkyl, alkenyl, aryl, aralkyl or —OSi(OR')$_3$. Preferably, R is hydrogen, alkyl or alkenyl having about 1 to about 18 carbon atoms or aryl or aralkyl having about 6 to about 24 carbon atoms. Most preferably, R is hydrogen, alkyl or alkenyl having about 1 to about 8 carbon atoms or aryl or aralkyl having about 6 to about 14 carbon atoms.

Also as defined above, R' groups of Formula IV are independently selected from alkyl, alkenyl, aryl or aralkyl, with the proviso that at least a majority of the R' radicals are sterically hindered alkyl groups having at least 3 carbon atoms. Preferably, at least a majority of the R' radicals are sterically hindered alkyl groups having about 3 to about 24 carbon atoms and, most preferably, are all sterically hindered alkyl groups having about 4 to about 12 carbon atoms. By sterically hindered is meant alkyl radicals which contribute to the hydrolytic stability of the molecule, i.e., which inhibit the reaction of water with the silicon-oxygen or the carbon-oxygen bonds in the molecule. Exemplary of sterically hindered alkyl radicals are non-linear primary alkyl radicals having a beta position side chain of at least 2 carbon atoms, secondary alkyl radicals and tertiary alkyl radicals. Particularly useful sterically hindered groups include sec. butyl, isobutyl, 2-ethyl butyl, 2-ethyl pentyl, 3-ethyl pentyl, 2-ethyl hexyl, 3-ethyl hexyl, 2,4-dimethyl-3-pentyl, etc.

The silicate cluster fluids are miscible with silicone oils in all proportions. Accordingly, in the present composition, any effective proportion of silicate cluster compounds may be used. As illustrated below, the addition of silicate cluster compounds results in increased lubricity properties of silicone oil compositions. Also, because of the hereinbelow described solubility effect of the silicate cluster, increasing amounts of these compounds permit accommodation of increasing amounts of property-enhancing additive ingredients. Generally, the cluster compounds are added in a proportion ranging from about 5 to about 95 percent by weight. Preferably, however, due to an unexplained inverse lubricity response found at near 50/50 blend ratios, the silicate cluster compounds are included in the silicone oil composition in a proportion ranging from about 20 to about 45 percent by weight, most preferably about 25 to about 40 percent; and in a proportion ranging from about 60 to about 95 percent of the cluster compounds by weight, most preferably about 65 to about 90 percent.

There are various inhibitors and other additives that are commonly known in the functional fluid art that can be employed in the presently described silicone oil composition to control or modify various chemical and physical properties of the fluids. The general term "inhibitor" is used for those additives which increase resistance to chemical changes. The ultimate function of an inhibitor is to maintain both the mechanical parts of the system and the fluid as close to their original conditions as possible.

Among the various types of additives which can be added to the silicone fluids of this invention are included: inhibitors for pH and corrosion control, antioxidants, rust inhibitors, viscosity-index improvers, pour-point depressants, wear additives, lubricating additives, anti-foamants, stabilizers, demulsifiers, dyes and odor suppressants. Generally, the total amount of additives which may be incorporated into the fluid composition will vary depending on the particular composition and the desired properties. More particularly, the total amount of additives will comprise from 0 to 20 percent and preferably from 0.1 to 8.0 percent by weight based on the total weight of the fluid composition.

A wide range of materials have found utility as antioxidants and any of these can be used in the compositions of the present invention. Generally the amount of antioxidant used will vary from 0 to 3 percent and preferably will be from 0.001 to 2.0 percent by weight based on the total weight of the fluid composition. Typical antioxidants include phenolic compounds, such as 2,2-di-(4-hydroxyphenyl)-propane, phenothiazine, phenothiazine-carboxylic acid esters, N-alkyl or N-arylphenothiazines such as N-ethyl-phenothiazine, N-phenyl-phenothiazine; polymerized trimethyldihydroquinoline; amines, such as phenyl-alphanaphthylamine, dioctyl diphenylamine, p-isopropoxy-diphenylamine, N,N-dibutyl-p-phenylene diamine, diphenyl-p-phenylene-diamine, N,N'-bis(1,4-dimethylpentyl)-p-phenylenediamine, N,N'-diisopropyl-p-phenylene-diamine, p-hydroxydiphenylamine; hindered phenols such as dibutyl cresol, 2,6-dimethyl-p-cresol, butylated 2,2-di-(4-hydroxyphenyl)-propane, n-butylated aminophenol, butylated hydroxyanisoles, such as 2,6-dibutyl-p-hydroxyanisole; anthraquinone, dihydroxy-anthraquinone, hydroquinone, 2,5-di-tertiary butylhydroquinone, 2-tertiary butylhydroquinone, quinoline, p-hydroxydiphenylamine, phenyl benzoate, p-hydroxy-anisole, pyrocathechol, styrenated phenol, and polyalkylpolyphenols. Mixtures of the above-mentioned antioxidants can be employed, if desired.

Inhibitors for corrosion control can be employed. These inhibitors are generally added in an amount of from 0.01 to 8.0 percent by weight based on the total weight of the fluid composition and preferably from 0.2 to 6.0 percent by weight on the same basis. Useful inhibitors include salicylyl-monoethanolamine, di-$\beta$-naphthyl-p-phenylene-diamine, N,N'-disalicylidene-1,2-propanediamine, N,N'-disalicylyl-ethylene-diamine; phosphites, such as triphenyl phosphite, tri(tertamylphenyl) phosphite, diisopropyl phosphite; mercaptobenzotriazole; triazoles including benzotriazole, 1,2-naphthotriazole, 4-nitrobenzotriazole, tolutriazole, aminobenzotriazoles such as 5-acylaminobenzotriazole, and alkyl-triazoles having 1 to 10 carbon atoms in the alkyl group as exemplified by methyl-triazole, ethyl-triazole, n-propyl-triazole, tertiary-butyl-triazole, hexyl-triazole, isodecyl-triazole. Other useful corrosion inhibitors include adenine, 4-methylimidazole, 3,5-dimethyl-pyrazole, 6-nitroimidazole, imidazole, benzimidazole, indazole, ammonium dinonylnaphthalenesulfonate, diolyl thiodipropionate, ethyl benzoate, ethyl p-aminobenzoate, 4,4'-methylene-bis(2,6-di-tert.-butylphenol), 4-hydroxymethyl-2,6-di-tert.-butylphenol, 4,4'-methylene-bis(4-methyl-6-tert.-butylphenol), salicylyl-o-aminophenol, 2,6-di-tert.-butyl-2-dimethylamino-p-cresol, 4,4'-thiobis-(6-tert.-butyl-o-cresol). Mixtures of the above inhibitors can be employed if desired.

An important class of inhibitors used in functional fluids are rust inhibitors. Rust preventative additives consist of polar compounds capable of being absorbed at the metal-fluid interface. These additives generally include: esters such as sorbitan monooleate, barium petroleum sulfonate, butyl stearates, butyl naphthenates; nitrogen compounds such as amines and amides; phosphorus compounds, such as phosphorus acid esters; and metal soaps, such as aluminum stearate. These rust inhibitors generally are used in an amount ranging from about 0.01 to about 10 percent; preferably from about 0.1 to about 2 percent.

Lubricating additives may also be included in the present compositions. These additives are often classified into three indistinct overlapping groups-extreme pressure agents, anti-wear agents, and lubricity agents. Such additives are represented by sulfur-containing compounds, reactive halogen-containing compounds, and phosphorus-containing compounds. Typical representatives include zinc dialkylphosphorodithionates, phosphate esters, phospho-sulfurized fats and hydrocarbons, chlorinated kerosenes and waxes, xanthates, sulfides and trithiocarbonates. These lubricity additives generally are employed in an amount ranging from about 0.1 to about 10 percent; preferably about 0.2 to about 2.0 percent.

The above noted inhibitors and additives are merely exemplary and are not intended as an exclusive listing of the many well-known materials which can be added to functional fluid compositions to obtain various desired properties. Numerous additives useful in hydraulic fluids are disclosed in *Introduction to Hydraulic Fluids* by Roger E. Hatton, Reinhold Publishing Corp., (1962).

The following examples illustrate various embodiments of the present invention; the examples, however are intended to be illustrative and not limiting in nature.

EXAMPLES I-IX

In each of the examples, a mixture was prepared consisting of about 32.5 parts by weight of a silicate cluster compound and about 67.5 parts by weight of a silicone oil. The resulting blends exhibited the viscosity, pourability, lubricity, and flash point properties reported on Table A, below. As shown in the Table, the addition of the silicate cluster compound served to effect a marked improvement in steel-on-steel lubricity. Comparative Examples 1-6 represent samples of the silicate cluster compounds and the silicone oils alone; Examples I-IX use blends of these silicate clusters and silicone oils, as indicated by Comparative Example numbers (e.g., "Cluster 1/Silicone 4" represents a blend of the silicate cluster of Comparative Example 1 with the silicone oil of Comparative Example 4). fluids, 50/50 blends were prepared of selected cluster compounds and silicone to which were added various

TABLE A

| | | Viscosities in cst | | | | Pourability @ -110° F. | Lubricities | | | |
|---|---|---|---|---|---|---|---|---|---|---|
| | | | | | | | 4- | | 4- | |
| Example No. | Fluid Composition | 100° F. | 210° F. | -65° F. | $VI_E$ | 1 hr. | Ball[7] | Falex[8] | Ball[9] | Falex[9] |
| Comp. Ex. 1 | Silicate Cluster[1] | 39.03 | 10.52 | 3385 | 288 | Pours | .7 | 0 | | |
| Comp. Ex. 2 | Silicate Cluster[2] | 39.75 | 10.98 | 6016 | 298 | Pours | .63 | | | |
| Comp. Ex. 3 | Silicate Cluster[3] | 48.28 | 13.62 | 4292 | 309 | Pours | .55 | | | |
| Comp. Ex. 4 | Silicone Oil[4] | 40.1 | 16.31 | 523 | 434 | Solid | 2.4 | 466 | | |
| Comp. Ex. 5 | Silicone Oil[5] | 92.43 | 35.17 | 2265 | 408 | Pours | 2.44 | | | |
| Comp. Ex. 6 | Silicone Oil[6] | 52.71 | 18.24 | 1395 | 377 | Pours | 1.28 | 78 | | |
| | Silicate Cluster/ Silicone Oil Mixes | | | | | | | | | |
| Ex. I | Cluster 1/Silicone 4 | 37.29 | 14.07 | 756 | 409 | Pours | 1.75 | 380 | 1.17 | 228 |
| Ex. II | Cluster 2/Silicone 4 | 38.93 | 14.65 | 937 | 407 | Pours | 1.63 | | | |
| Ex. III | Cluster 3/Silicone 4 | 39.43 | 14.78 | 829.8 | 405 | Pours | 1.60 | | | |
| Ex. IV | Cluster 1/Silicone 5 | 74.30 | 25.84 | 2357 | 381 | Pours | 1.64 | | | |
| Ex. V | Cluster 2/Silicone 5 | 74.43 | 26.11 | 2748 | 383 | Pours | 1.64 | | | |
| Ex. VI | Cluster 3/Silicone 5 | 75.33 | 26.67 | 2517 | 386 | Pours | 1.66 | | | |
| Ex. VII | Cluster 1/Silicone 6 | 45.73 | 15.05 | 1914 | 359 | Pours | 1.19 | 126 | | |
| Ex. VIII | Cluster 2/Silicone 6 | 48.74 | 16.04 | 2319 | 359 | Pours | 1.39 | | | |
| Ex. IX | Cluster 3/Silicone 6 | 48.88 | 16.12 | 2137 | 360 | Pours | 1.15 | | | |

[1] tris(tri-sec-butoxysiloxy)methylsilane available from Olin Corporation under the trademark "Silicate Cluster 102".

[2] neopentyl double cluster compound 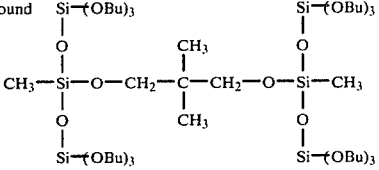 available from Olin Corporation under the trademark "Silicate Cluster 2102".

[3] silicone-bridged double cluster 3,7-di[tri-sec-butoxysilyloxy]-3,5,5,7-tetramethyl-1,1,1,9,9,9-hexa-sec-butoxy pentasiloxane.
[4] dimethyl polysiloxane available from Dow Corning under the trademark "DC-561".
[5] phenylmethyl polysiloxane available from General Electric under the trademark "SF 1153".
[6] chlorophenyl polysiloxane available from General Electric under the trademark "Versilube F-50".
[7] 40 kg, 1200 RPM, 167° F., 1 hr.
[8] 100 # gauge load, 15 min.
[9] includes 1% dialkyl diarylamine antioxidant available from Ciba-Geigy under the trademark "Irganox LO-6", .1% p,p'-dioctyl diphenylamine antioxidant available from R. T. Vanderbilt under the trademark "Van Lube 81", and 2% P,S,Zn wear additive available from Lubrizol under the trademark "Lubrizol 1395".

EXAMPLES X-XVIII

To demonstrate the ability of the silicate cluster compounds to enhance the additive solubility of silicone oil common fluid additives. The solubility of these additives in the respective blends is reported in Table B, below. Comparative Examples 7-9 illustrate the solubility of the additives in silicone oil alone.

TABLE B

Solubilization of Additives in Silicones and Silicone/Silicate Cluster Blends

| Additive @1% | | Fluid Composition | Comp. Ex. 7 Silicone Oil[1] | Ex. X Silicone[1]/ Cluster[4] | Ex. XI Silicone[1]/ Cluster[5] | Ex. XII Silicone[1]/ Cluster[6] |
|---|---|---|---|---|---|---|
| Antioxidant[7] | | RT/-40° | soluble/insoluble | soluble/insoluble | soluble/soluble | soluble/soluble |
| Wear Additive[8] | | | soluble/insoluble | soluble/soluble | soluble/soluble | —/— |
| Lubricity Promoter[9] | | | insoluble/insoluble | soluble/soluble | soluble/soluble | soluble/soluble |
| Corrosion Inhibitor[10] | | | insoluble/insoluble | soluble/soluble | soluble/insoluble | —/— |
| Rust Inhibitor[11] | | | insoluble/insoluble | soluble/soluble | soluble/insoluble | soluble/slightly soluble |
| | | Fluid Composition | Comp. Ex. 8 Silicone Oil[2] | Ex. XIII Silicone[2]/ Cluster[4] | Ex. XIV Silicone[2]/ Cluster[5] | Ex. XV Silicone[2]/ Cluster[6] |
| Antioxidant[7] | | RT/-40° | soluble/soluble | —/— | —/— | soluble/soluble |
| Lubricity Promoter[9] | | | insoluble/insoluble | soluble/soluble | soluble/soluble | soluble/soluble |
| Rust Inhibitor[11] | | | insoluble/insoluble | soluble/soluble | soluble/soluble | soluble/soluble |
| | | Fluid Composition | Comp. Ex. 9 Silicone Oil[3] | Ex. XVI Silicone[3]/ Cluster[4] | Ex. XVII Silicone[3]/ Cluster[5] | Ex. XVIII Silicone[3]/ Cluster[6] |
| Antioxidant[7] | | RT/-40° | slightly soluble/insoluble | soluble/soluble | soluble/soluble | soluble/soluble |
| Lubricity Promoter[9] | | | insoluble/insoluble | soluble/soluble | soluble/soluble | soluble/soluble |

TABLE B-continued

| Solubilization of Additives in Silicones and Silicone/Silicate Cluster Blends | | | | |
|---|---|---|---|---|
| Rust Inhibitor[11] | insoluble/insoluble | soluble/soluble | soluble/soluble | soluble/soluble |

[1] dimethyl polysiloxane available from Dow Corning under the trademark "DC 561".
[2] phenylmethyl polysiloxane available from General Electric under the trademark "SF 1153".
[3] chlorophenyl polysiloxane available from General Electric under the trademark "Versilube F-50".
[4] tris(tri-sec-butoxysiloxy)methylsilane available from Olin Corporation under the trademark "Silicate Cluster 102".
[5] neopentyl double cluster compound Si—(OBu)$_3$    Si—(OBu)$_3$ available from Olin Corporation under the $$CH_3-\underset{\underset{O}{|}}{\overset{\overset{O}{|}}{Si}}-O-CH_2-\underset{\underset{CH_3}{|}}{\overset{\overset{CH_3}{|}}{C}}-CH_2-O-\underset{\underset{O}{|}}{\overset{\overset{O}{|}}{Si}}-CH_3$$

trademark "Silicate Cluster 2102".    Si—(OBu)$_3$    Si—(OBu)$_3$
[6] silicone bridged double cluster 3,7-di[tri-sec-butoxysilyloxy]-3,5,5,7-tetramethyl-1,1,1,9,9,9-hexa-sec-butoxy pentasiloxane.
[7] phenyl α-naphthylamine available from Union Carbide under the name "PANA".
[8] P,S,Zn wear additive available from Lubrizol under the trademark "Lubrizol 1395".
[9] ashless P,S wear additive available from R. T. Vanderbilt under the trademark "Van Lube 719".
[10] rust inhibitor available from Lubrizol under the trademark "Lubrizol 850".
[11] barium sulfonate rust inhibitor available from R. T. Vanderbilt under the trademark "Nasul BSN".

EXAMPLES XIX–XXX

To illustrate the effect of varying the proportions of silicate cluster compounds with silicone oil compositions, a series of blends was prepared. Table C, below, shows the pourability, viscosity, flash point and lubricity properties accomplished with blends of tris(tri-sec-butoxysiloxy)methylsilane (available from Olin Corporation under the trademark "Silicate Cluster 102") and dimethyl polysiloxane (available from Dow Corning under the trademark "DC 561"). For unexplained reasons, an inverse lubricity effect was noted with blends approaching 50/50. The table indicates the enhanced lubricity and pour point results achieved with the addition of the silicate cluster compound to the silicone oil.

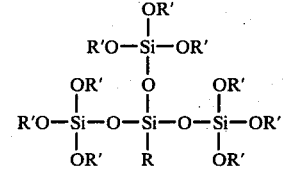

wherein R is hydrogen, alkyl, alkenyl, aryl or aralkyl and each R' is independently selected from the same group as R with the proviso that at least a majority of R' radicals on each Si are sterically hindered alkyl groups having at least 3 carbon atoms;

alkoxysilane multiple cluster compounds having a formula selected from the formulae:

TABLE C

| | Blends of tris(tri-sec-butoxysiloxy)methylsilane and Dimethyl Polysiloxane | | | | | | | | | | | |
|---|---|---|---|---|---|---|---|---|---|---|---|---|
| Examples | XIX | XX | XXI | XXII | XXIII | XXIV | XXV | XXVI | XXVII | XXVIII | XXIX | XXX |
| % Silicone | 0 | 10 | 25 | 37.5 | 50 | 56.25 | 60 | 62.5 | 65 | 75 | 90 | 100 |
| Pour Point | | | | | | | | | | | | |
| 1 hr., −110 to 120° F. | Pours | Pours | Pours | Pours | Pours | Pours | Pours | Pours | Pours | Pours | Pours | Solid |
| Viscosity, 100° F. | 38.2 | 36.11 | 36.0 | | 36.14 | | | | | 39.0 | 40.4 | 40.1 |
| 210° F. | 10.2 | 10.53 | 11.43 | | 12.80 | | | | | 14.94 | 16.22 | 16.31 |
| VI$_E$ | 285 | 315 | 346 | | 386 | | | | | 413 | 429 | 434 |
| Seta Flash Point °F. | 397 | 397 | 402 | | 412 | | | | | 450 | 485 | 520 |
| 4-Ball Wear[1] | 0.63 | 0.69 | 1.71 | 1.94 | 2.43 | 1.65 | 1.76 | 1.63 | 1.68 | 1.78 | 2.13 | 2.39 |
| | 0.61 | 0.66 | 1.64 | 1.92 | 2.43 | 1.77 | 1.79 | 1.71 | 1.68 | 1.81 | 2.05 | 2.42 |
| | 0.63 | 0.60 | 1.32 | | 2.20 | 1.72 | 1.79 | 1.74 | 1.73 | 1.80 | 2.07 | |
| | 0.66 | 0.60 | 1.74 | | 2.35 | | | | | 1.74 | 2.10 | |
| | 0.58 | | 1.70 | | 2.31 | | | | | 1.57 | | |
| | 0.57 | | | | | | | | | | | |

[1] 40 kg, 1200 RPM, 167° F., 1 hr.

What is claimed is:

1. A functional fluid composition comprising a silicone oil and an effective proportion of a silicate cluster compound selected from the group consisting of alkoxysilane cluster compounds, alkoxysilanol cluster compounds, halogenated alkoxysilane cluster compounds, alkoxysilane multiple cluster compounds, and silicone-bridged alkoxysilane cluster compounds.

2. The composition of claim 1 wherein said silicate cluster compound is selected from the group consisting of alkoxysilane cluster compounds having the general formula:

and

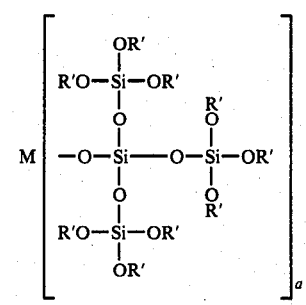

-continued

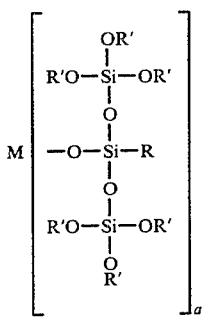

wherein a=2, 3 or 4; M is a substituent branched or straight chain hydrocarbon radical; R is hydrogen, alkyl, alkenyl, aryl or aralkyl and each R' is independently selected from the same group as R with the proviso that at least a majority of R' radicals on each Si are sterically hindered alkyl groups having at least 3 carbon atoms;

and silicone-bridged alkoxysilane double cluster compounds having the formula:

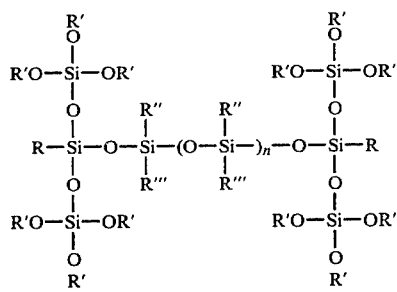

wherein n is an integer from 0 to 300; R is hydrogen, alkyl, alkenyl, aryl, aralkyl or —OSi(OR')$_3$; each R' is independently selected from alkyl, alkenyl, aryl or aralkyl with the proviso that at least a majority of R' radicals are sterically hindered alkyl groups having at least 3 carbon atoms; and R'' and R''' are independently selected from hydrogen, alkyl, alkenyl, aryl, aralkyl, hydroalkyl, and halo or cyano substituted alkyl, alkenyl, aryl, aralkyl, and hydroalkyl.

3. The composition of claim 2 wherein the silicate cluster compound is an alkoxysilane cluster compound.

4. The composition of claim 3 comprising an alkoxysilane cluster compound wherein R is hydrogen, alkyl or alkenyl having about 1 to about 18 carbon atoms or aryl or aralkyl having about 6 to about 24 carbon atoms.

5. The composition of claim 4 comprising an alkoxysilane cluster compound wherein R is hydrogen, alkyl or alkenyl having about 1 to about 8 carbon atoms or aryl or aralkyl having about 6 to about 14 carbon atoms.

6. The composition of claim 5 comprising an alkoxysilane cluster compound consisting of tris(tri-sec-butoxysiloxy)methylsilane.

7. The composition of claim 2 wherein the silicone oil is selected from the group consisting of polydimethyl silicones, polyphenylmethyl silicones, polychlorophenylmethyl silicones, and polytrifluoropropyl silicones.

8. The composition of claim 7 wherein the silicone oil is a polydimethyl silicone.

9. The composition of claim 2 comprising about 5 to about 95 percent by weight of silicate cluster compound.

10. The composition of claim 9 comprising about 20 to about 45 percent by weight of silicate cluster compound.

11. The composition of claim 10 comprising about 25 to about 40 percent of silicate cluster compound.

12. The composition of claim 9 comprising about 60 to about 95 percent by weight of silicate cluster compound.

13. The composition of claim 12 comprising about 65 to about 90 percent of silicate cluster compound.

* * * * *